US011614014B2

(12) United States Patent
Schoettle et al.

(10) Patent No.: US 11,614,014 B2
(45) Date of Patent: Mar. 28, 2023

(54) APPARATUS FOR SUPPLYING VOLTAGE

(71) Applicant: Dr. Ing. h.c. F. Porsche Aktiengesellschaft, Stuttgart (DE)

(72) Inventors: Dimo Schoettle, Muehlacker (DE); Juergen Scholz, Tiefenbronn (DE); Kai Soeren Mueller, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/541,368

(22) Filed: Dec. 3, 2021

(65) Prior Publication Data

US 2022/0186648 A1  Jun. 16, 2022

(30) Foreign Application Priority Data

Dec. 10, 2020  (DE) ..................... 10 2020 132 997.0

(51) Int. Cl.
*F01N 3/20* (2006.01)
*H02M 1/00* (2006.01)
*H02M 3/158* (2006.01)

(52) U.S. Cl.
CPC .......... *F01N 3/2013* (2013.01); *H02M 1/007* (2021.05); *H02M 3/158* (2013.01)

(58) Field of Classification Search
CPC ....... F01N 3/2013; H02M 1/007; H02M 3/00; H02M 1/14; H02M 3/156; B60R 16/03; B60R 16/033; H02J 7/0063; H02J 2207/20; H05B 1/0236
USPC ...................... 422/174; 219/202, 205; 60/284
See application file for complete search history.

(56) References Cited

U.S. PATENT DOCUMENTS

| 5,404,720 | A | * | 4/1995 | Laing | ........................ F01N 9/00 60/284 |
| 5,512,789 | A | * | 4/1996 | Lyon | ........................ F01N 9/00 219/205 |
| 5,555,725 | A | * | 9/1996 | Shimasaki | .............. F01N 11/00 219/202 |
| 5,580,477 | A |   | 12/1996 | Oota et al. | |

(Continued)

FOREIGN PATENT DOCUMENTS

DE     4421066 A1    1/1995
DE    19940802 A1    4/2001

(Continued)

OTHER PUBLICATIONS

Dusan Graovac, et al., "48V Vehicle Electrical System—More Than Just a Bridging Technology?", https://www.eetasia.com/48v-vehicle-electrical-system-more-than-just-a-bridging-technology/, Apr. 23, 2020, pp. 1-8, AspenCore Media, San Francisco, USA.

*Primary Examiner* — Tom P Duong
(74) *Attorney, Agent, or Firm* — Leydig, Voit & Mayer, Ltd.

(57) ABSTRACT

An apparatus supplies voltage for an electrical heating catalytic converter. The apparatus includes: a direct current (DC) converter having an input for an input voltage and an output for an output voltage; a buck converter, which is configured to step down the output voltage of the DC converter to a supply voltage, which is lower than the output voltage, for the electrical heating catalytic converter; and a first electrical assembly, which is configured to rectify and smooth the supply voltage.

16 Claims, 1 Drawing Sheet

(56) References Cited

U.S. PATENT DOCUMENTS

| | | | | |
|---|---|---|---|---|
| 6,003,304 A | * | 12/1999 | Swanson | F01N 11/00 219/508 |
| 10,161,277 B2 | * | 12/2018 | Jorgensen | F01N 9/00 |
| 2002/0170548 A1 | * | 11/2002 | Masters | F02P 9/002 123/640 |
| 2005/0212501 A1 | * | 9/2005 | Acatrinei | H02M 1/36 323/283 |
| 2006/0070372 A1 | * | 4/2006 | Lucas | F01N 9/00 60/275 |
| 2012/0181990 A1 | | 7/2012 | Asakura et al. | |
| 2013/0008148 A1 | | 1/2013 | Katsuta | |
| 2014/0266006 A1 | * | 9/2014 | Luke | B60L 58/12 320/106 |
| 2015/0336465 A1 | * | 11/2015 | Luke | B60L 55/00 320/109 |
| 2020/0112260 A1 | | 4/2020 | Suzuki et al. | |

FOREIGN PATENT DOCUMENTS

| | | |
|---|---|---|
| JP | 2004340035 A | 12/2004 |
| JP | 2012152029 A | 8/2012 |

\* cited by examiner

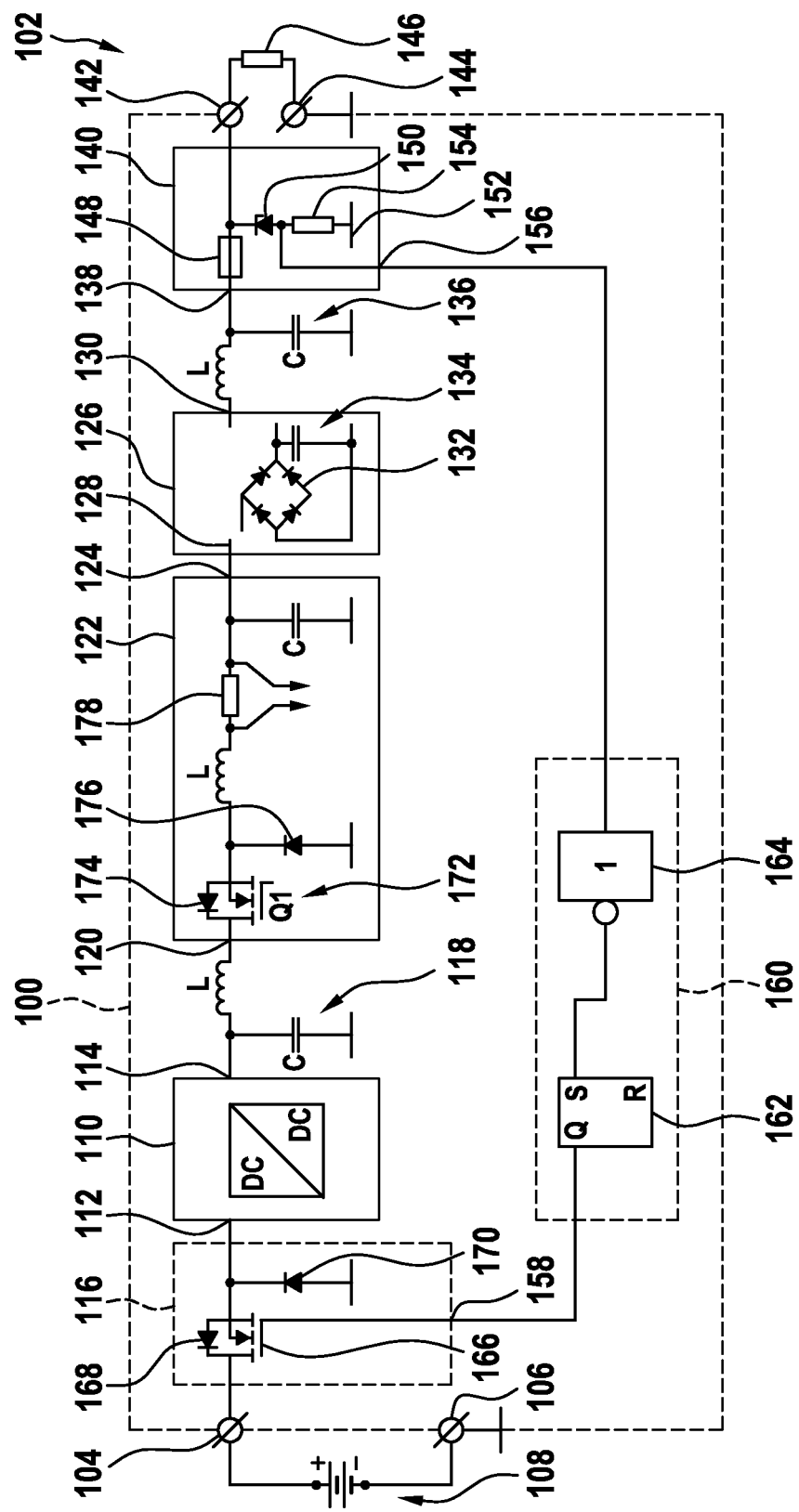

APPARATUS FOR SUPPLYING VOLTAGE

CROSS REFERENCE TO RELATED APPLICATIONS

This application claims benefit to German Patent Application No. DE 10 2020 132 997.0, filed on Dec. 10, 2020, which is hereby incorporated by reference herein.

FIELD

The invention relates to an apparatus for supplying voltage in particular for an electrical heating catalytic converter of a motor vehicle.

BACKGROUND

DE 19940802 A1 discloses an electrical heating catalytic converter that is fed by a buck converter. DE 4421066 A1 discloses an electrical heating catalytic converter that is fed by a boost converter.

SUMMARY

In an embodiment, the present disclosure provides an apparatus that supplies voltage for an electrical heating catalytic converter. The apparatus includes: a direct current (DC) converter having an input for an input voltage and an output for an output voltage; a buck converter, which is configured to step down the output voltage of the DC converter to a supply voltage, which is lower than the output voltage, for the electrical heating catalytic converter; and a first electrical assembly, which is configured to rectify and smooth the supply voltage.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an apparatus for supplying voltage.

DETAILED DESCRIPTION

Embodiments of the present invention provide an improved voltage supply.

According to an aspect of the present invention, an apparatus for supplying voltage for an electrical heating catalytic converter, in particular of a motor vehicle, comprises: a direct current (DC) converter having an input for an input voltage and an output for an output voltage, a buck converter, which is designed to step down the output voltage of the DC converter to a supply voltage, which is lower than the output voltage, for the electrical heating catalytic converter, wherein a first electrical assembly, which is designed to rectify and smooth the supply voltage, is arranged. The buck converter is significantly more cost-effective. As a result, a significantly smaller and more cost-effective apparatus that delivers a well suited DC voltage for a heating catalytic converter can be realized.

The output of the DC converter is, in a preferred embodiment, DC-isolated from the input of the DC converter. The DC isolation between the voltage source and the heating catalytic converter leads to low losses.

The first electrical assembly, in a preferred embodiment, comprises a rectifier and a choke or a capacitor.

The DC converter, in a preferred embodiment, is designed for an input voltage in a range, in particular between 300 volts and 500 volts, wherein the DC converter is designed for an output voltage in essentially the same range, in particular in the range between 300 volts and 500 volts.

The DC converter, in a preferred embodiment, is designed for an input voltage and for an output voltage that is essentially 400 volts.

The buck converter, in a preferred embodiment, is designed to provide the supply voltage with less than 70 volts, less than 60 volts or less than 50 volts. The step down from 400 V to values smaller than these values leads to low losses in the buck converter and is significantly more cost-effective and can be built to be smaller than a DC/DC converter of 400 V to these values.

A second electrical assembly, which is designed to protect the electrical heating catalytic converter from an overvoltage, is, in a preferred embodiment, arranged between a connection for the electrical heating catalytic converter and the buck converter.

The second electrical assembly, in a preferred embodiment, comprises a fuse, which can be arranged in a series circuit with a consumer of the electrical heating catalytic converter, and a Zener diode, which can be arranged between the connection and the fuse in a parallel circuit with the consumer of the electrical heating catalytic converter, in particular with a threshold voltage greater than the supply voltage, preferably of 70 volts, 60 volts or 50 volts.

The second electrical assembly, in a preferred embodiment, has a resistor, which is arranged in a series circuit between the Zener diode and ground, and a tap for a voltage between the Zener diode and the resistor, said tap being arranged between the Zener diode and the resistor.

The apparatus, in a preferred embodiment, has a switching device between a terminal for a battery and the input for the DC converter, wherein the switching device has a signal input, and is designed to produce an electrically conductive connection between the terminal and the input in the case of a first signal level at the signal input and to interrupt an electrically conductive connection between the terminal and the input in the case of a second signal level at the signal input, wherein the apparatus comprises a logic group, which is designed to produce a signal at the first signal level when the voltage at the tap falls below a threshold value and to produce a signal at the second signal level when the voltage at the tap reaches or exceeds the threshold value.

The logic group, in a preferred embodiment, comprises an RS flip-flop, which is designed to output the signal at the first signal level when a level is applied to an input of the RS flip-flop for setting the RS flip-flop or otherwise to produce the signal at the second signal level, wherein the logic group comprises a NAND gate, which is designed to output the level at the input of the RS flip-flop when the voltage at the tap falls below the threshold value, and otherwise does not output the level.

In one aspect, a first filter is arranged between the DC converter and the buck converter. In one aspect, a second filter is arranged between the first electrical assembly and the second electrical assembly.

The first filter, in a preferred embodiment, comprises a choke, which can be arranged in a series circuit with a consumer of the electrical heating catalytic converter, and a capacitor, which can be arranged between the output of the DC converter and the choke in a parallel circuit with the consumer of the electrical heating catalytic converter.

The second filter, in a preferred embodiment, comprises a choke, which can be arranged in a series circuit with a consumer of the electrical heating catalytic converter, and a capacitor, which can be arranged between the fuse and the choke in a parallel circuit with the consumer of the electrical heating catalytic converter.

A heating catalytic converter and a motor vehicle comprising such an apparatus are likewise provided. A motor vehicle comprising such a heating catalytic converter is likewise provided.

FIG. 1 illustrates an apparatus 100 for supplying voltage for an electrical heating catalytic converter 102 in particular of a motor vehicle. The apparatus 100 may be part of a controller for the heating catalytic converter 102.

The apparatus 100 has a first terminal 104 and a second terminal 106 for a connection to a battery 108 or another voltage source.

The apparatus 100 has a DC converter 110 having an input 112 for an input voltage and an output 114 for an output voltage.

In the example, the output 114 of the DC converter 110 is DC-isolated from the input 112 of the DC converter 110.

In the example, the DC converter 110 is designed for an input voltage in a range, in particular between 300 volts and 500 volts. In the example, the DC converter 110 is designed for an output voltage in essentially the same range, in particular in the range between 300 volts and 500 volts.

In the example, the battery 108 or the other voltage source delivers a voltage in the same range. For example, the battery 108 or the voltage source delivers a direct current at a voltage of 400 volts. The DC converter 110 is preferably designed for an input voltage and for an output voltage that is essentially 400 volts.

A switching device 116 is arranged between the input 112 and the first terminal 104.

A first filter 118, via which the DC converter 110 is connected to an input 120 of a buck converter 122, is arranged at the output 114.

The buck converter 122 is designed to step down the output voltage of the DC converter 110 to a supply voltage, which is lower compared to the output voltage, at an output 124 of the buck converter 122.

The buck converter 122 is designed for example to provide the supply voltage with less than 70 volts, less than 60 volts or less than 50 volts. In the example, provision is made for the supply voltage to be below 60 volts. The exact value of the supply voltage is adjusted to the electrical heating catalytic converter 102 by appropriately selecting the components of the buck converter 122.

The apparatus 100 also has a first electrical assembly 126, which is designed to rectify and to smooth the supply voltage. In the example, the supply voltage is applied to an input 128 of the first electrical assembly 126. In the example, a rectified supply voltage is output at an output 130 of the first electrical assembly 126.

The first electrical assembly 126 comprises for example a series circuit of a rectifier and a choke or, as illustrated in FIG. 1, a H-bridge as rectifier 132 and a capacitor 134, which is connected in parallel with the two half-bridges of the H-bridge. Here and in the following text, choke denotes an inductance, for example a coil.

A second filter 136, via which the first assembly 126 is connected to an input 138 of a second assembly 140, is arranged at the output 130 of the first assembly 126.

The second electrical assembly 140 is arranged between the buck converter 122 and a first connection 142 for the electrical heating catalytic converter 102. The second assembly 140 has a second connection 144 for the electrical heating catalytic converter 102.

The second electrical assembly 140 is designed to protect the electrical heating catalytic converter 102 from an overvoltage.

In the example, the second electrical assembly 140 comprises a fuse 148, which can be arranged in a series circuit with a consumer 146 of the electrical heating catalytic converter 102, and a Zener diode 150, which can be arranged between the first connection 142 and the fuse 148 in a parallel circuit with the consumer 146 of the electrical heating catalytic converter 102. In the example, the Zener diode 150 has a threshold voltage greater than the supply voltage. Examples of the values of the threshold voltage are 70 volts, 60 volts or 50 volts. In the example, the threshold voltage is essentially greater by a tolerance value than the supply voltage for the heating catalytic converter 102 should be nominally. In the example, the threshold voltage is 60 volts.

The second electrical assembly 140 comprises a resistor 154, which is arranged in a series circuit between the Zener diode 150 and ground 152, and has a tap 156, which is arranged between the Zener diode 150 and the resistor 154.

The switching device 116 has a signal input 158. The switching device 116 is designed to produce an electrically conductive connection between the first terminal 104 and the input 112 of the DC converter 110 in the case of a first signal level at the signal input 158. The switching device 116 is designed to interrupt an electrically conductive connection between the first terminal 104 and the input 112 of the DC converter 110 in the case of a second signal level at the signal input 158.

The apparatus 100 comprises a logic group 160. The logic group 160 is designed to produce a signal at the first signal level when the voltage at the tap 156 falls below a threshold value and to produce a signal at the second signal level when the voltage at the tap 156 reaches or exceeds the threshold value. Hysteresis may be provided.

In the example, the logic group 160 comprises an RS flip-flop 162. The RS flip-flop 162 is designed to output the signal at the first signal level when a level is applied at an input S of the RS flip-flop for setting the RS flip-flop. The RS flip-flop 162 is otherwise designed to produce the signal at the second signal level.

In the example, the logic group 160 comprises a NAND gate 164. The NAND gate 164 is designed to output the level at the input S of the RS flip-flop when the voltage at the tap 156 falls below the threshold value, and otherwise does not output the level.

In the example, the first filter 118 comprises a choke L, which can be arranged in a series circuit with the consumer 146 of the electrical heating catalytic converter 102, and a capacitor C, which can be arranged between the output 114 of the DC converter 110 and the choke L in a parallel circuit with the consumer 146 of the electrical heating catalytic converter 102.

In the example, the second filter 118 comprises a choke L, which can be arranged in a series circuit with the consumer 146 of the electrical heating catalytic converter 102, and a capacitor C, which can be arranged between the fuse 148 and the choke L in a parallel circuit with the consumer 146 of the electrical heating catalytic converter 102.

In the example, the switching device 116 has a normally blocking n-channel MOSFET. A source connection of the MOSFET is connected to the gate connection via a diode 168 arranged in the forward direction in the direction of the gate connection of said MOSFET. The source connection of the MOSFET is connected to ground via a diode 170 arranged in the reverse direction in the direction of ground.

In the example, the buck converter 122 has a normally blocking n-channel MOSFET. A source connection of the MOSFET is connected to the gate connection via a diode 174 arranged in the forward direction in the direction of the gate connection of said MOSFET. The source connection of the MOSFET is connected to ground via a diode 176 arranged in the reverse direction in the direction of ground. The gate connection is connected to the input 120 of the buck converter 120. The buck converter 122 also has a coil L. The coil L is connected by way of one input thereof to the source connection of the MOSFET. The coil L is connected by way of the other input thereof to an input of a current sensor 178. The other input of the current sensor 178 is connected to the output 124 of the buck converter 122. The buck converter 122 also has a capacitor C, which is connected to the output 124 on one side and to ground on the other side.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for supplying voltage for an electrical heating catalytic converter, the apparatus comprising:
    a direct current (DC) converter comprising an input for an input voltage and an output for an output voltage;
    a buck converter, which is configured to step down the output voltage of the DC converter to a supply voltage, which is lower than the output voltage, for the electrical heating catalytic converter; and
    a first electrical assembly, which is configured to rectify and smooth the supply voltage.

2. The apparatus as claimed in claim 1, wherein the output of the DC converter is DC-isolated from the input of the DC converter.

3. The apparatus as claimed in claim 1, wherein the first electrical assembly comprises a rectifier and a choke or a capacitor.

4. The apparatus as claimed in claim 1, wherein the DC converter is configured to receive the input voltage in a predetermined range wherein the DC converter is configured to output the output voltage in essentially the same predetermined range.

5. The apparatus as claimed in claim 1, wherein the DC converter is configured to receive the input voltage and to output the output voltage at essentially 400 volts.

6. The apparatus as claimed in claim 1, wherein the buck converter is configured to provide the supply voltage with less than 70 volts, less than 60 volts, or less than 50 volts.

7. The apparatus as claimed in claim 1, the apparatus comprising a second electrical assembly, which is configured to protect the electrical heating catalytic converter from an overvoltage, arranged between a connection for the electrical heating catalytic converter and the buck converter.

8. The apparatus as claimed in claim 7, wherein the second electrical assembly comprises a fuse, which is configured to be arranged in a series circuit with a consumer of the electrical heating catalytic converter, and a Zener diode, which is configured be arranged between the connection and the fuse in a parallel circuit with the consumer of the electrical heating catalytic converter, with a threshold voltage greater than the supply voltage.

9. The apparatus as claimed in claim 8, wherein the second electrical assembly comprises a resistor, which is arranged in a series circuit between the Zener diode and ground, and a tap for a voltage between the Zener diode and the resistor, the tap being arranged between the Zener diode and the resistor.

10. The apparatus as claimed in claim 1, the apparatus comprising:
    a switch between a terminal for a battery and the input for the DC converter, the switch having a signal input, and the switch being configured to produce an electrically conductive connection between the terminal and the input in the case of a first signal level at the signal input and to interrupt an electrically conductive connection between the terminal and the input in the case of a second signal level at the signal input; and
    a logic group, which is configured to produce a signal at the first signal level in a case that the voltage at the tap falls below a threshold value and to produce a signal at the second signal level in a case that the voltage at the tap reaches or exceeds the threshold value.

11. The apparatus as claimed in claim 10, wherein the logic group comprises:
    an RS flip-flop, which is configured to output the signal at the first signal level in the case that a level is applied to an input of the RS flip-flop for setting the RS flip-flop or otherwise to produce the signal at the second signal level; and
    a NAND gate, which is configured to output the level at the input of the RS flip-flop in the case that the voltage at the tap falls below the threshold value, and otherwise does not output the level.

12. The apparatus as claimed in claim 1, wherein a first filter is arranged between the DC converter and the buck converter or a second filter is arranged between the first electrical assembly and the second electrical assembly.

13. The apparatus as claimed in claim 12, wherein the first filter comprises a choke, which is configured to be arranged in a series circuit with a consumer of the electrical heating catalytic converter, and a capacitor, which is configured to be arranged between the output of the DC converter and the choke in a parallel circuit with the consumer of the electrical heating catalytic converter.

14. The apparatus as claimed in claim 12, wherein the second filter comprises a choke, which is configured to be arranged in a series circuit with a consumer of the electrical heating catalytic converter, and a capacitor, which is configured to be arranged between the fuse and the choke in a parallel circuit with the consumer of the electrical heating catalytic converter.

15. An electrical heating catalytic converter for a motor vehicle, wherein the electrical heating catalytic converter comprises the apparatus as claimed in claim 1.

16. A motor vehicle, the motor vehicle comprising the apparatus as claimed in claim 1.

\* \* \* \* \*